(12) United States Patent
Harris

(10) Patent No.: US 11,391,911 B2
(45) Date of Patent: Jul. 19, 2022

(54) HIGH PRECISION AND LOW CROSS-COUPLING LASER STEERING

(71) Applicant: Bio-Rad Laboratories, Inc., Hercules, CA (US)

(72) Inventor: Rodney C. Harris, Fort Collins, CO (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 239 days.

(21) Appl. No.: 15/929,676

(22) Filed: May 15, 2020

(65) Prior Publication Data

US 2020/0271894 A1 Aug. 27, 2020

Related U.S. Application Data

(63) Continuation of application No. 15/415,715, filed on Jan. 25, 2017, now Pat. No. 10,663,690.

(60) Provisional application No. 62/287,846, filed on Jan. 27, 2016.

(51) Int. Cl.
*G02B 7/182* (2021.01)
*G02B 26/08* (2006.01)
*G02B 27/14* (2006.01)

(52) U.S. Cl.
CPC ......... *G02B 7/1821* (2013.01); *G02B 7/1825* (2013.01); *G02B 26/0816* (2013.01); *G02B 27/141* (2013.01)

(58) Field of Classification Search
CPC ................ G02B 7/1821; G02B 7/1825; G02B 26/0816; G02B 27/141

USPC .......................... 359/618, 629, 642, 811, 819
See application file for complete search history.

(56) References Cited

U.S. PATENT DOCUMENTS

| 4,925,288 A | * | 5/1990 | Harris | G02B 7/1825 359/876 |
| 5,400,184 A | | 3/1995 | Kuklo | |
| 5,505,422 A | | 4/1996 | Elterman | |
| 6,296,362 B1 | * | 10/2001 | Tinti | G02B 7/1825 359/872 |
| 6,411,447 B1 | | 6/2002 | Hilbert | |
| 2017/0212326 A1 | | 7/2017 | Harris | |

FOREIGN PATENT DOCUMENTS

| DE | 102013221044 | 4/2015 |
| JP | 58127107 | 7/1983 |
| WO | WO 2015/055489 | 4/2015 |

OTHER PUBLICATIONS

"Kinematic Gimbal Mirror Mounts"; downloaded from https://www.newport.com/f/gimbal-minor-mounts on Mar. 8, 2018, but at least the figure to the right of "Gimbal vs. Non Gimbal Mounts" section was publicly available prior to Jan. 27, 2016.

(Continued)

*Primary Examiner* — Tuyen Tra
(74) *Attorney, Agent, or Firm* — Weaver Austin Villeneuve & Sampson LLP

(57) ABSTRACT

Disclosed is an adjustable mirror mount that is capable of adjusting a mirror in two axes with a high degree of precision and low cross-coupling. Long horizontal and vertical adjustment arms are used to allow the precision adjustment about both a horizontal axis and a vertical axis.

20 Claims, 15 Drawing Sheets

(56) References Cited

OTHER PUBLICATIONS

"Optical Mirror Mount Guide"; downloaded from https://www.newport.com/g/optical-mirror-mount-guide on Mar. 8, 2018.
"Classic Corner Mirror Mount, 2.0 in., 3 Knob Adjustment (MODEL: 9852)", downloaded from https://www.newport.com/p/9852 on Mar. 8, 2018, but publicly available prior to Jan. 27, 2016.
"Gimbal Gimbal Center Mirror Mount, 2.0 in., 2 Locking Knobs (MODEL: U200-G2K)", downloaded from https://www.newport.com/p/U200-G2K on Mar. 8, 2018, but publicly available prior to Jan. 27, 2016.
International Search Report and Written Opinion, International Application No. PCT/US2017/015427, dated Apr. 4, 2017.
Extended European Search Report in Application Serial No. 17745006.1, dated Sep. 16, 2019.

\* cited by examiner

HIGH PRECISION AND LOW CROSS-COUPLING LASER STEERING

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

Optical systems are used in a large number of analytical devices for various purposes, such as identifying and/or characterizing particles, such as cells, in flow cytometry systems. Many optical systems, such as flow cytometers, require careful steering of laser beams to operate properly. If a laser beam in a flow cytometry system is misaligned, even by a small amount, the system sensitivity may be degraded or the system's ability to characterize particles may cease to function. The present disclosure relates to a laser steering device for compact optical systems.

SUMMARY

One aspect of the disclosure pertains to an adjustable mirror mount for rotating a reflection surface of a mirror. In some embodiments, an adjustable mirror mount may include: (a) a mirror holder configured to hold a mirror such that a reflection surface of the mirror is parallel with a horizontal axis, (b) a vertical adjustment arm rigidly connected to the mirror holder, (c) a horizontal adjustment arm coupled to the vertical adjustment arm by one or more vertical pivots, allowing the vertical adjustment arm to rotate about the horizontal axis relative to the horizontal adjustment arm, (d) a horizontal pivot pin that is coupled with the horizontal adjustment arm and has a center axis aligned with a vertical axis passing through the reflection surface, (e) a cleat that is adjustably coupled to the horizontal adjustment arm, (f) a horizontal adjustment screw that changes the separation distance between the horizontal adjustment arm and the cleat causing the horizontal adjustment arm and the mirror holder to rotate about the vertical axis relative to the cleat when the horizontal pivot and the cleat are held in fixed locations, and (g) a vertical adjustment screw that changes the separation distance between the vertical adjustment arm and the horizontal adjustment arm and causes the vertical adjustment arm and the mirror holder to rotate about the horizontal axis.

In some embodiments, a spring may connect the cleat with the horizontal adjustment arm and apply a biasing force to the horizontal adjustment arm. In some additional or alternative such embodiments, a spring may connect the vertical adjustment arm with the horizontal adjustment arm and apply a biasing force to the vertical adjustment arm.

In some additional embodiments, at least one of the one or more vertical pivots may include a pivot ball or a pivot rod. In some additional or alternative such embodiments, the horizontal pivot may include a rod or pin.

In some embodiments, the tip of the vertical adjustment screw may press against a sapphire pad located on the horizontal adjustment arm or the vertical adjustment arm. In additional or alternative such embodiments, the tip of the horizontal adjustment screw may press against a sapphire pad located on the horizontal adjustment arm or the cleat.

In some embodiments, the horizontal adjustment arm may have a rigid support structure having one or more support columns on which the one or more vertical pivots are located, and in some further such embodiments the vertical adjustment arm may pass through this rigid support structure.

In some embodiments, the perpendicular distance between the horizontal axis and the reflection surface may be less than about 15 mm, and in some further such embodiments the distance may be less than about 8 mm.

In some embodiments, the mirror may have a second surface facing away from the reflection surface, and the adjustable mirror mount may have an opening that is configured for light transmission into the second surface and out of the reflection surface. In some embodiments, the adjustable mirror mount may be configured such that light beams at an angle less than about 50°, less than about 40°, or less than about 30° relative to the reflection surface may pass through the second surface and out of the reflection surface without being occluded by the mirror holder.

In some embodiments, the adjustable mirror mount may be configured such that light beams are reflected off the reflection surface without being occluded by the mirror holder when the angle of the incident light beam relative to the reflection surface is less than about 50°, less than about 40°, or less than about 35°.

In some embodiments, the vertical pivot arm length between the horizontal axis and the vertical adjustment screw may be in the range of about 35 mm to about 45 mm. In some other or additional embodiments, the horizontal pivot arm length between the vertical axis and the horizontal adjustment screw may be in the range of about 50 mm to about 55 mm.

In some embodiments, the vertical pivot on the adjustable mirror mount may be configured to permit the reflective surface to be rotated at least 3° about the horizontal axis.

In some embodiments, the vertical adjustment screw and the horizontal adjustment screw may have between about 40 and about 100 threads per inch or metric equivalents within this range.

In some embodiments, the length of the adjustable mirror mount along the horizontal axis may be between about 1 inch and about 2 inches.

In some embodiments, the adjustable mirror mount may have an overall shape substantially in the shape of a T when viewed along a direction parallel to the vertical axis, the T having a stem portion that substantially bisects a cap portion that is transverse to the stem portion and forming an interior corner between the cap portion and each side of the stem portion. In such embodiments, The mirror holder may be in the cap portion and the horizontal adjustment arm may be in the stem portion, and the adjustable mirror mount may be configured such that an identical, separate adjustable mirror mount is positionable with an end of the cap portion for the identical, separate adjustable mirror mount located in one of the interior corners of the adjustable mirror mount such that a single optical line-of-sight passes through the mirror holders of both adjustable mirror mounts.

In some embodiments, the adjustable mirror mount may have an overall shape substantially in the shape of an L when viewed along a direction parallel to the vertical axis, the L having a stem portion and a cap portion that is transverse to the stem portion. In such embodiments, an interior corner may be defined between the cap portion and the stem portion, the mirror holder may be in the cap portion and the horizontal adjustment arm may be in the stem portion, and the adjustable mirror mount may be configured such that an identical, separate adjustable mirror mount is positionable with an end of the cap portion for the identical, separate adjustable mirror mount located in one of the interior corners of the adjustable mirror mount such that a single optical line-of-sight passes through the mirror holders of both adjustable mirror mounts.

In some embodiments, the cleat and horizontal pivot may be configured to be attached to an optical breadboard.

Another aspect of the present disclosure pertains to a system for aligning laser beams that may be characterized by: (a) two or more lasers having different wavelengths; (b) at least one adjustable mirror mount configured with a dichromic mirror that is configured to reflect a laser beam and allows at least one laser beam to pass through the mirror such that the reflected and transmitted beams form a combined beam; and (c) a targets location where the combined beam is directed that is configure such that all the optical beam pathways are less than 50 cm.

Figure 1:
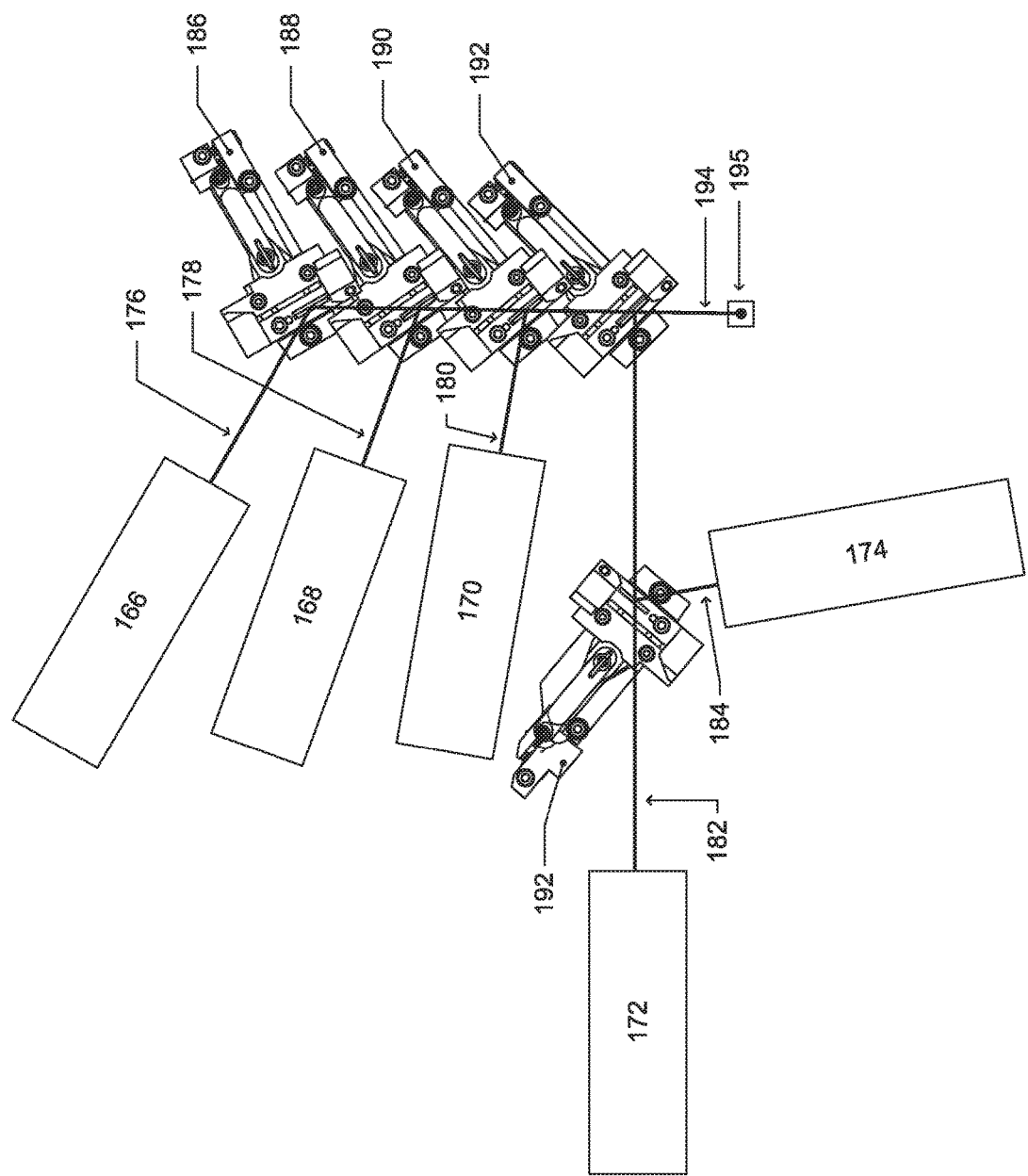
FIG. 1 is a plan view of an implementation of an example arrangement of a plurality of example adjustable mirror mounts as may be found in an example flow cytometer.

The Figures are drawn to scale within each Figure, although the scale from Figure to Figure may vary.

DETAILED DESCRIPTION

In the following description, specific details are set forth in order to provide a thorough understanding of the presented concepts. The presented concepts may be practiced without some or all of these specific details. While some concepts will be described in conjunction with the specific embodiments, it will be understood that these embodiments are not intended to be limiting. As used herein "each" or "every" may refer to every member of a multiple-member group or to the only member of a single member group, e.g., use of "each" in the context of a group that can have one or more members should not be understood to imply that the group has at least two members. It is to be understood that the use of relative terms such as "above," "on top," "below," "underneath," etc. are to be understood to refer to spatial relationships of components with respect to the orientations of those components when the adjustable mirror mounts discussed herein are mounted to a horizontal surface—although such adjustable mirror mounts are also mountable to surfaces in any orientation, and it is to be understood, for example, that a component that is "above" another component when mounted to a horizontal surface does not cease to be "above" the other component when the horizontal surface is turned upside down.

Flow cytometry systems analyze the physical and chemical characteristics of particles in a fluid as the particles in the fluid pass through at least one laser beam. Beam steering systems are utilized in flow cytometry systems to direct laser beams so that they intersect a fluid sample containing particles at an appropriate measurement location; this intersection of the fluid sample with the laser beam is also called "interrogation." To minimize sensitivity degradation resulting from optical losses, it is desirable that the beam length from emission point to sample intersection point of each sample-interrogating laser in a flow cytometry system be minimized. When a plurality of lasers is used in a flow cytometry system, it becomes important for whatever beam steering systems are used to have a small footprint so that the optical paths do not become too long, which increases beam dispersion and negatively impacts system operation. It is also important for beam steering systems to allow for simple user adjustment so that an installer can quickly and accurately adjust the laser beam paths. While commercially available beam steering systems may be used in such applications, these mounting systems are large and result in long beam paths when used, and/or they introduce axis cross-coupling and may be difficult to configure. Axis cross-coupling occurs when rotation of a mirror about an axis results in a translation of the reflected beam. For example, if a mirror is rotated about a horizontal axis it may also be translated slightly in the horizontal plane. This cross-coupling effect makes it more difficult for a user to configure lasers in a flow cytometry system, as even minute lateral shifts of a laser beam may cause it to no longer illuminate the desired measurement location in the fluid sample. The adjustable mirror mount disclosed herein is an elegant solution that reduces cross-coupling while providing compact beam steering for applications such as flow cytometry systems.

FIG. 1 illustrates an implementation of an example adjustable mirror mount in a flow cytometry system. As shown in FIG. 1, a plurality of lasers 166, 168, 170, 172, 174 are located in an instrument, such as a flow cytometer, in very tight quarters. The laser beams 176, 178, 180, 182, 184 for lasers 166-174, respectively, are to be combined into a single combined beam 194. In some embodiments, the lasers 176-184 may be vertically separated within the combined beam, e.g., by 50 µm to about 100 µm each, when focused. A plurality of adjustable mirror mounts 186, 188, 190, 192, and 193 may be used to combine these beams into the combined beam 194, which is directed at a measurement location 195, with a high degree of precision, i.e., on the micron scale. In a flow cytometry system, the measurement location is typically a cuvette through which a sample fluid passes containing the particles being characterized—the sample fluid may be hydrodynamically focused within the cuvette to cause the particles of interest to occupy only a very small volume within the cuvette. As can be seen, in order to make the beam steering assembly relatively compact, the adjustable mirror mounts 186-192 may be spaced very closely in their lateral directions, e.g., directions parallel to the reflection surfaces of the mirrors held in the mirror mounts, so that the adjustable mirror mounts 186-192 overlap in some lateral locations along their lateral directions. However, the length of the adjustable mirror mounts 186-192 can be made longer, so that a higher degree of precision can be provided in adjusting the various laser beams 176, 178, 180, 182, 184 even in this compact arrangement of adjustable mirror mounts, such as may be found in a very confined space.

Figure 2:
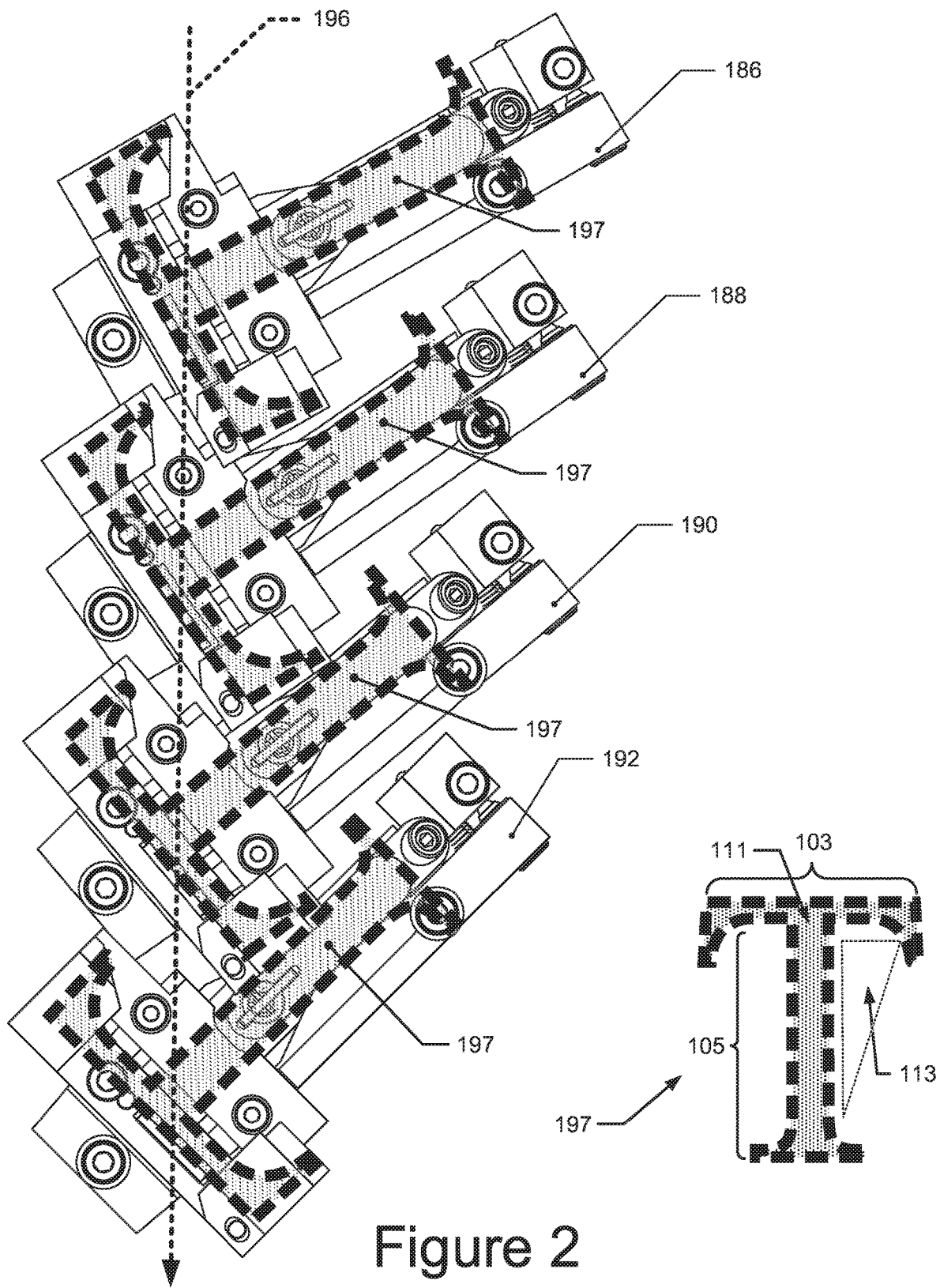
FIG. 2 is a plan view of a plurality of example adjustable mirror mounts.

FIG. 2 provides an enlarged plan view of the four adjustable mirror mounts 186-192 that are compactly arranged to pass light along a combined beam axis 196. As can be seen by the overlaid letters "T", 197, the mirror mounts have a "T" shaped layout. The "T" shape has a cap 103 (which corresponds to the horizontal part of the letter "T"), corresponding to the mirror holder and generally extending along a direction parallel to the mirror surface. The "T" shape also has a stem 105 (which corresponds to the vertical part of the letter "T"), corresponding to the length of the mirror mount in the direction of the adjustment arms. The vertex 111 of the "T" shapes is placed at the reflection point of the mirror and the "T" has an interior region 113 where an adjacent adjustable mirror mount may be placed. This T-shaped design allows the adjustable mirror mounts to be closely packed together, e.g., nested into one another, such that an adjustable mirror mount may be placed in the interior region of an adjacent adjustable mirror mount while still providing long adjustment arms to make minor rotational adjustments. In some cases the length of an adjustable mirror mount in the direction corresponding to the stem is less than about 6 inches, in some cases less than about 4 inches, and in some cases less than about 2 inches. The length of the mirror mount corresponding to the cap is sometimes less than about 15%, in some cases less than about 25% smaller, and in some cases less than about 35% smaller than the length of the mirror mount in its longer direction.

Figure 3:
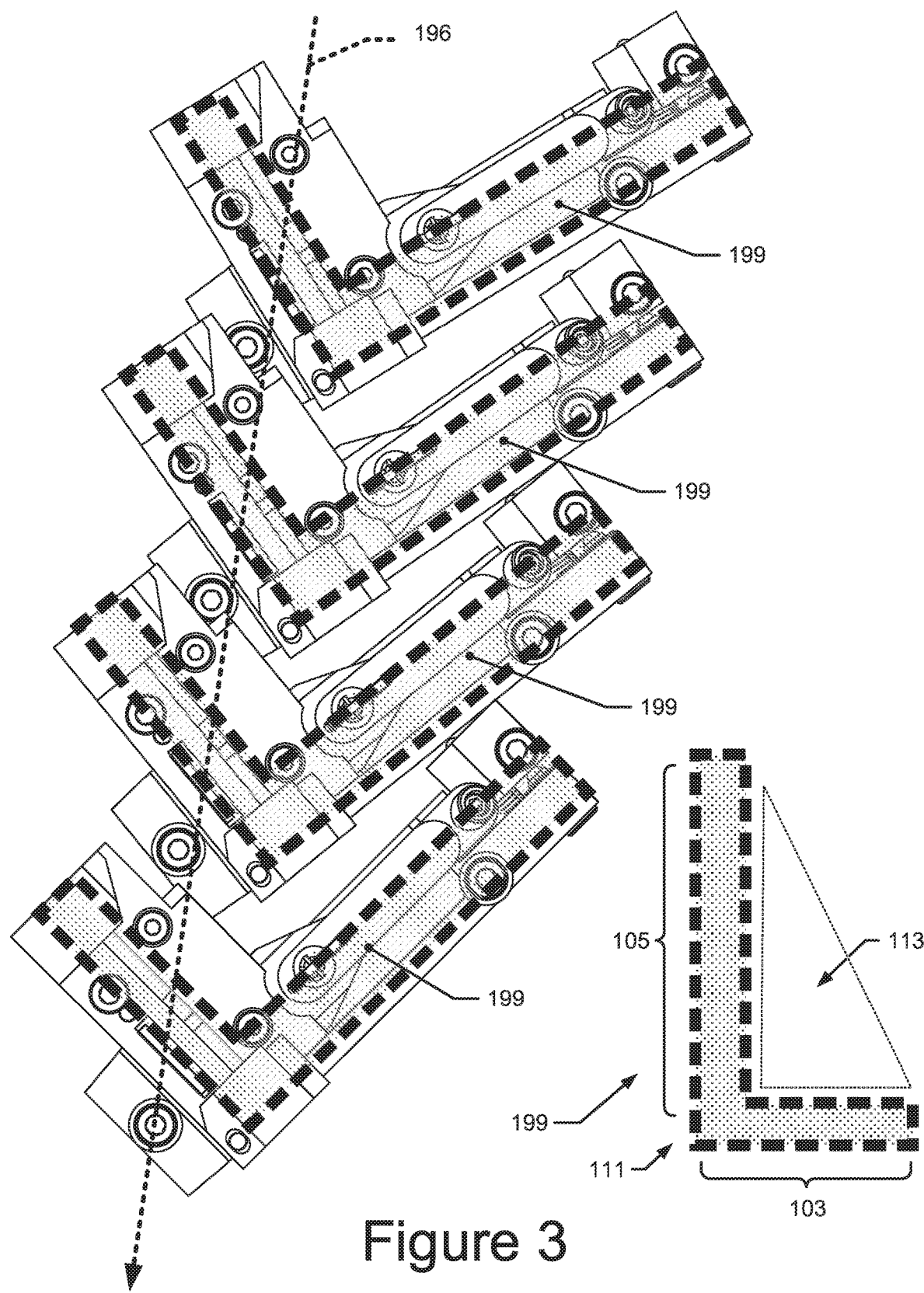
FIG. 3 is a plan view of another plurality of different example adjustable mirror mounts.

In some cases, a mirror mount may have a layout that differs somewhat from the "T" shape depicted in FIG. 2, but still allows mirrors to be packed closely together. For example, in some cases, the angle between the stem and cap of the "T" may be less than 90°. In some other or additional instances, the stem of the "T" may be shifted to one side or the other so that the adjustable mirror mount may more closely take the shape of an "L" or "Γ" (the Greek capital lambda). FIG. 3 depicts how mirror mounts having an L- or Γ-shaped layout 199 may be arranged to pass light along a combined beam axis 196. The "L" shape also has a stem 105, corresponding to the length of the mirror mount in the direction of the adjustment arms. In this case, the vertex 111 of the "L" shape is offset from the reflection point of the mirror and the horizontal pivot. The "L" shape has an interior region 113 where an adjacent adjustable mirror mount may be placed. Like the "T" shape, the "L" shape allows the adjustable mirror mounts to be closely packed together, such that an adjustable mirror mount may be placed in the interior region of an adjacent adjustable mirror mount while still providing long adjustment arms to make minor rotational adjustments.

It is to be understood that the example adjustable mirror mounts discussed with respect to FIGS. 2 and 3 may be thought of as being substantially T-shape or L-shaped—they may have protuberances, recesses, or proportions that may detract from these shapes, but it will be understood that such adjustable mirror mounts may still reasonable be described as T-shaped or L-shaped and are thus considered to be "substantially" T-shaped or L-shaped. Moreover, it is to be understood that the "stem" portion in such adjustable mirror mounts may be moved, for example, to any point between the center of the cap portion, where it bisects the cap portion, and the end of the cap portion. For a T-shaped adjustable mirror mount, the stem portion may substantially bisect the cap portion, e.g., divide the cap portion into equal halves or even into unequal halves, e.g., 40/60.

For a given light beam that reflects off of a mirror, if the mirror is rotated about a horizontal axis or vertical axis (or both such axes) that does not pass through the reflection point, which is the point where the light beam is reflected by the mirror, the reflected light beam will be translated in space along an axis of the incident light beam due to axis cross-coupling. Axis cross-coupling generally results in a spatial displacement of the beam as a result of the spatial displacement of the reflection point of the mirror when the optics are adjusted. As such, the beam cannot be easily steered. Spatial displacement, or spatial translation, may be acceptable within certain ranges depending upon the application of the mirror mount. In some cases, such as in some flow cytometry applications, axis cross-coupling may be acceptable if it results in a translation of less than about 30 microns, in some cases less than about 20 microns, and in some cases less than about 10 microns, through about 3° of beam steering adjustment. While systems such as gimbal mounts can be used, in theory, to virtually eliminate axis cross-coupling, such systems are very expensive and also quite large (e.g., having square or rectangular mounting footprints on the order of 2" wide by 2" long or larger)—they are also difficult to accurately adjust. In the context of a tight packaging environment, such as in a flow cytometer, the use of gimballed mirror mounts would be prohibitively expensive and would also undesirably increase beam path length, thereby reducing optical performance of such systems.

Figure 4A:
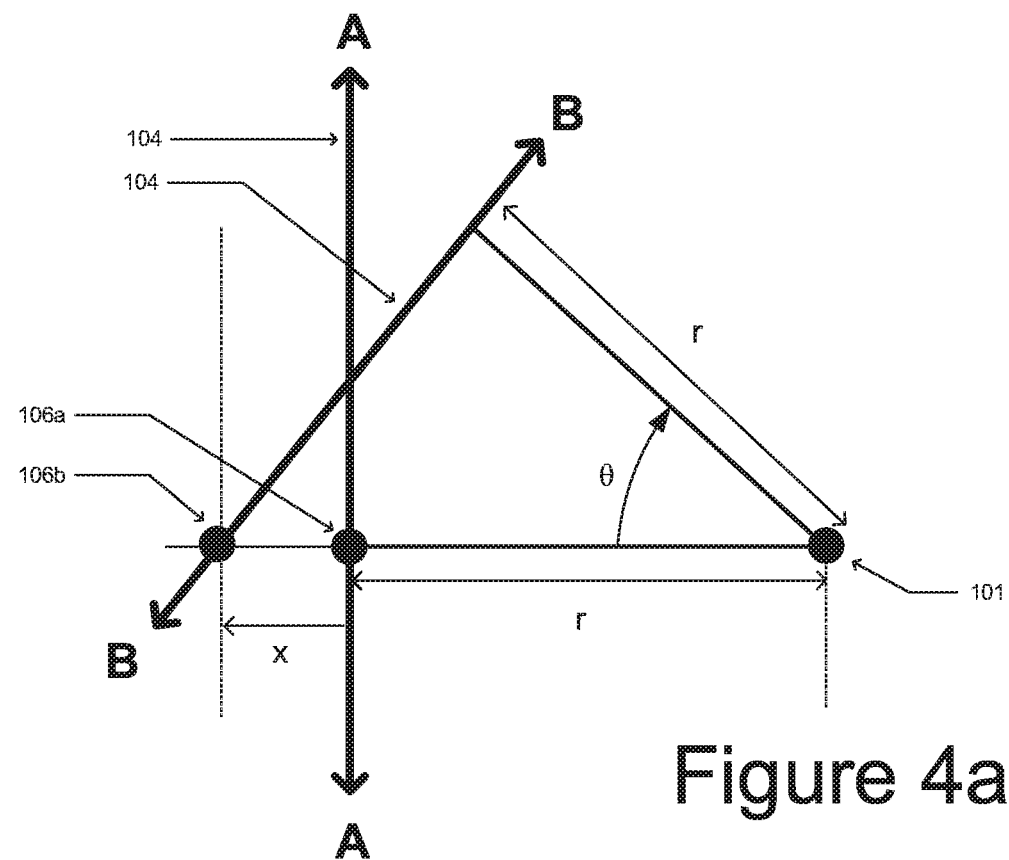
FIGS. 4a and 4b are illustrations of the manner in which cross-coupling can occur.
Figure 4B:
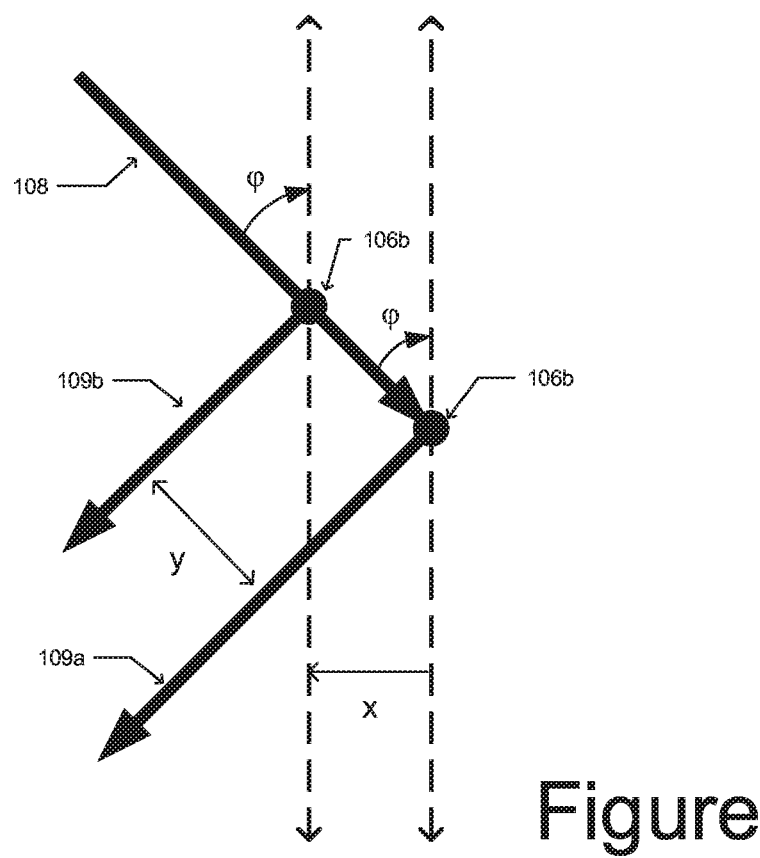

FIGS. 4a and 4b provide an illustration of axis cross-coupling in which a reflected beam is translated when mirror is rotated about an axis located a distance r from the reflective surface. FIG. 4a is a perspective viewed along the horizontal axis of rotation, and FIG. 4b is a view along the vertical axis. As depicted, a mirror 104 is rotated from a first position, marked by letters A/A, having reflection point 106a to a second position, marked by the letters B/B, having reflection point 106b. The rotation of the mirror around pivot point 101 results in a lateral translation of the reflection point equal to a distance x given by Equation 1, where r is the perpendicular distance from the pivot point 101 to the reflective surface, θ is the angle that the mirror is rotated about pivot point 101. Perpendicular distance is the distance between two objects as measured along a direction that is perpendicular to one or both objects. In this case the perpendicular distance is measured along a direction that is perpendicular to the reflective surface and the axis about which pivot point 101 rotates.

$$x = r(\sec \theta - 1) \quad \text{Equation (1)}$$

The lateral translation of the reflection point by a distance x results in a lateral translation of the beam, y, that is dependent on the incident angle, φ, of the incident beam 108 from the reflection surface. Taking into account the incident angle and the translation of the translation of the reflection point, the translation of the reflected beam from an initial position 109a to a final 109b can be determined using Equation 2.

$$y = \frac{r(\sec\theta - 1)}{\sin(\phi)} \qquad \text{Equation (2)}$$

As can be seen in Equation 2, the lateral cross-coupling effect may be reduced when r is small (and it vanishes completely when r=0). It is desirable for y to be reduced as beams may incur further translation before reaching their target location if they pass through one or more dichroic mirrors. For example, laser beam 176 (FIG. 1) may be further translated as a result of passing through the backside of the dichroic mirrors in adjustable mirror mounts 188-192. For most laser steering applications, this additional translation caused by passing through additional dichroic mirrors is generally insignificant.

Figure 5:
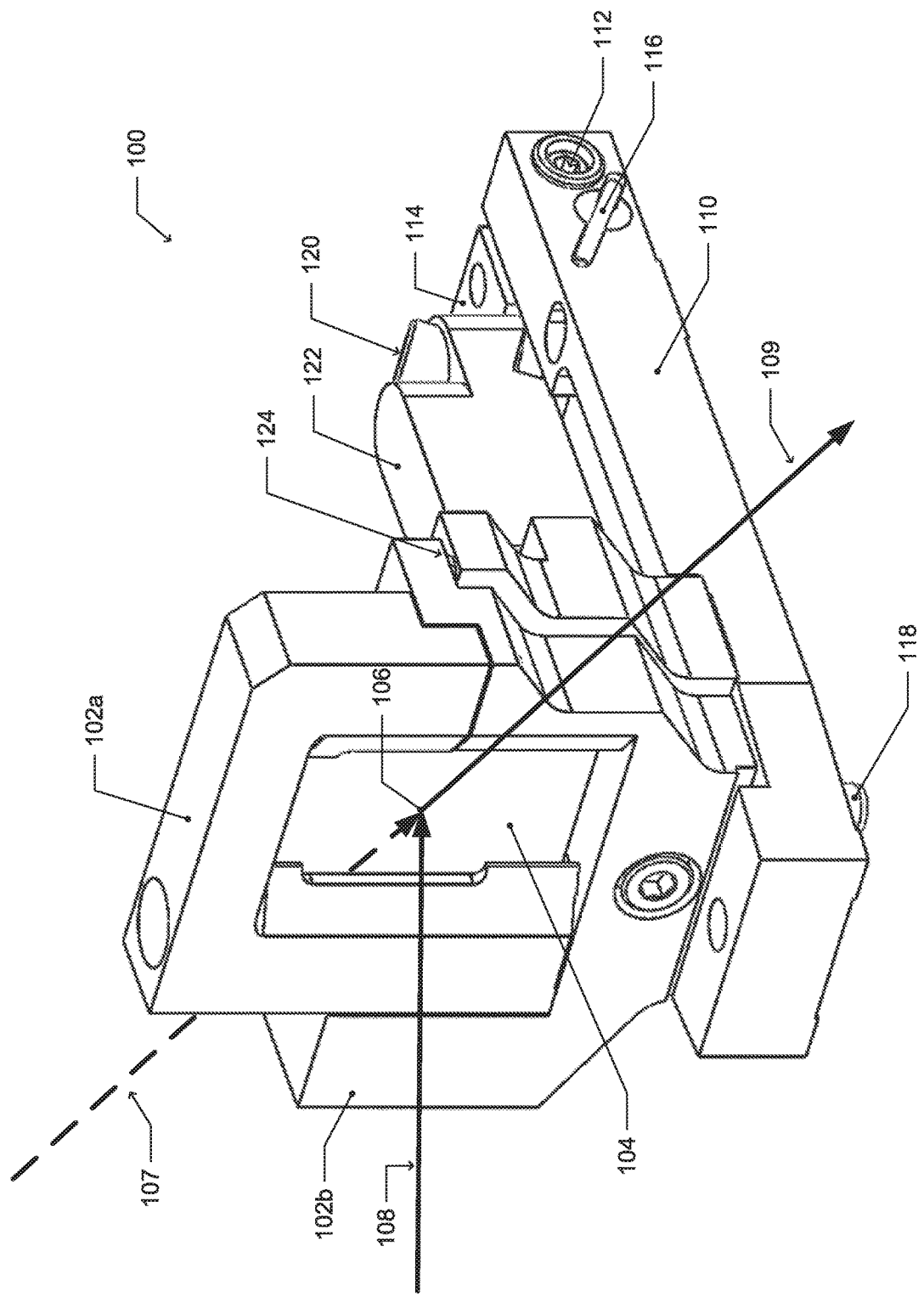
FIG. 5 is a view of an embodiment of an adjustable mirror mount.

FIG. 5 is a view of an embodiment of an adjustable mirror mount 100. As illustrated in FIG. 5, a mirror holder 102*a/b* holds a mirror 104 in a predetermined position to reflect a light beam, such as light beam 108. Light beam 108 contacts the mirror 104 at a reflection point 106 and is reflected off of the front surface of the mirror 104 as beam 109. In order to steer the reflected light beam 109 in the desired direction, the mirror holder 102*a/b* may be rotated. Very fine adjustments are required to properly steer the light beam 109 in certain applications. In some embodiments, mirror 104 is a dichroic mirror that is configured for a transmitted beam 107 to pass through the back surface of the mirror and onto beam path 109 or on another path similar to beam path 109. When used in a flow cytometer, light beam 108 may be a laser beam that may be very accurately directed to form a combined beam, e.g., by combining a transmitted beam 107 and a reflected beam 108. As used herein, the term "mirror" can be any type of reflective surface, including dichroic mirrors, dichroic filters, mirrors that have a reflective coating deposited on the front surface of a substrate such as glass, a partially transmissive mirror, a polished metal surface, or any other type of reflective surface.

In order to accurately steer the light beam 108, the mirror holder 102*a/b* may be accurately and very finely rotated about two axes, e.g., a vertical axis passing through the reflective surface at the reflection point 106 and a horizontal axis that is parallel to the surface of mirror 104 and normal to the vertical axis. Typically, the vertical axis and horizontal axis align with the global vertical and horizontal planes, respectively; however, this need not be the case. For example, a mirror mount may be mounted upside-down or on a titled surface. As depicted, the vertical axis skims along the surface of the vertically disposed mirror 104 through the reflection point 106. The horizontal axis is parallel to an axis that also passes through the center 106 of the mirror and skims along the reflective surface of the mirror 104. The horizontal axis is offset from the reflection point 106 of the mirror by a distance, r, and is orthogonal to the vertical axis. In some embodiments, the offset distance, r, between the reflection point 106 and the horizontal axis is less than about 15 mm, in some embodiments the offset distance is less than about 8 mm. In some embodiments, the offset distance (see 119 in FIG. 12) is about 7 mm. As described elsewhere herein, if the distance r is reduced the translation of a reflected beam due to the rotation of a mirror will also be reduced. Rotation of the mirror in the mirror holder about the vertical axis causes the light beam 108 to be deflected at different angles in the horizontal plane. Similarly, rotation of the mirror holder about the horizontal axis deflects the light beam 108 in the vertical plane.

As further shown in FIG. 5, the horizontal alignment arm 110 has a length that is sufficient to allow the horizontal adjustment screw 112 to adjust the mirror 104 about a vertical axis to steer the light beam 108 with the accuracy desired to align the light beam 108. The horizontal adjustment screw 112 is a fine pitch screw that moves laterally only a small amount for each rotation of the horizontal adjustment screw 112. The amount that the horizontal adjustment screw 112 moves for each complete turn is referred to as the screw pitch (P). The angle ($\theta$) that the horizontal adjustment arm 110 moves is given by Equation 3.

$$\sin \theta = P/L \qquad \text{Equation (3)}$$

where:
P=Pitch of the screw (amount moved by screw for one rotation of screw)
L=Length of the Adjustment Arm (horizontal pivot arm length 146 of FIG. 8)
$\theta$=Angle moved by Adjustment Arm Accordingly, Equation 3 may be used to determine how far a screw should be rotated to achieve the desired adjustment angle ($\theta$). Clearly, the longer the horizontal adjustment arm 110, the better the accuracy that can be obtained in steering the light beam 109. Generally, an adjustment screw can have any pitch desired, although for fine pitch adjustment, pitches of up to about 40 to up to about 100 threads per inch may be preferable. Mirror mounts used in beam steering systems that combine numerous laser beams, such as illustrated in FIG. 1, may not have a significant amount of space in the lateral directions of the adjustable mirror mounts because of the close spacing of the laser beams that are combined into a single combined beam. However, there is certainly more space in a lengthwise direction, such as the lengthwise direction in which the horizontal adjustment arm extends, which allows the adjustable mirror mount 100 to extend in the lengthwise direction and create better accuracy in steering the light beam 108. As an example, in one embodiment, the adjustment screw pitch is equal to 0.10 mm while the length of the horizontal lever arm is 50 mm. Again, these parameters provide for a high degree of accuracy in directing the light beam.

Figure 6:
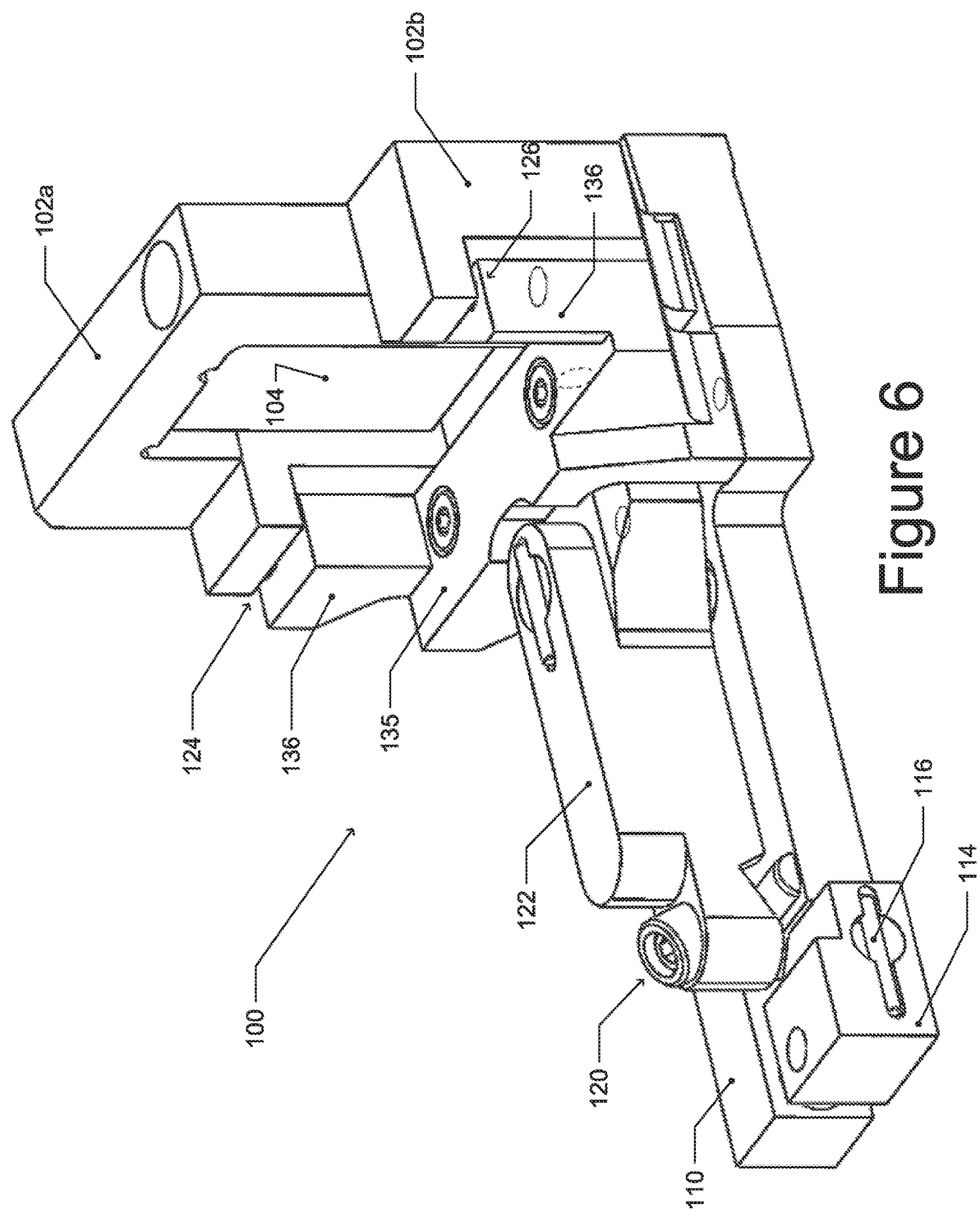
FIG. 6 is another view of the embodiment of the adjustable mirror mount of FIG. 5.
Figure 8:
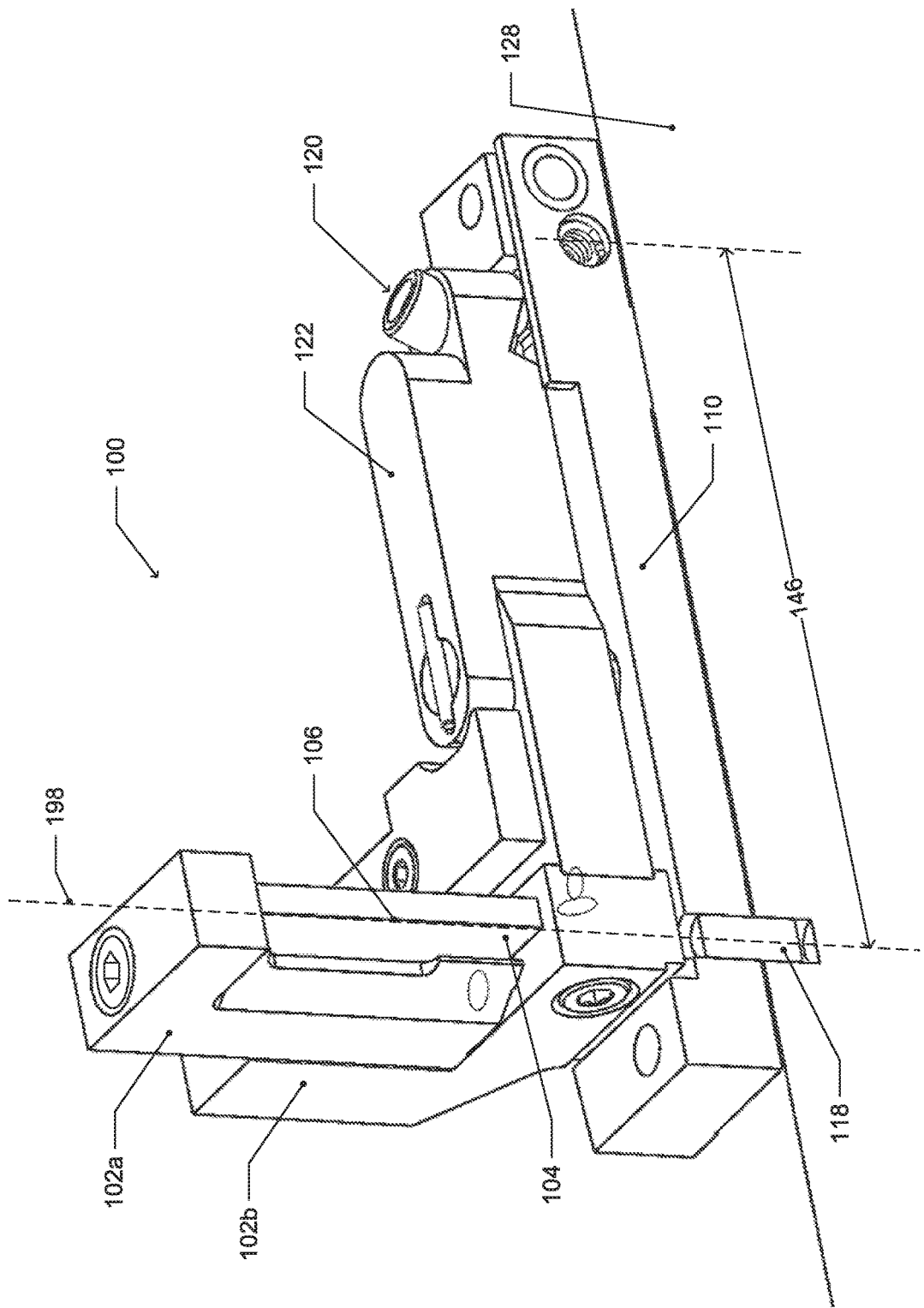
FIG. 8 is a sectional view of the embodiment of the adjustable mirror mount of FIG. 5.

FIG. 6 is a diagram of the adjustable mirror mount 100 of FIG. 5 illustrated from a different view angle. As illustrated in FIG. 6, the adjustable mirror mount 100 has a mirror holder 102*a/b* that holds mirror 104. The mirror holder is connected to vertical pivots 124 and 126 that rotationally couple the mirror holder with the horizontal adjustment arm 110. As shown, vertical pivots 124 and 126 are located on columns 136 extending from support structure 135. Support structure 136 has an opening that allows vertical adjustment arm 122 to pass through it. In some embodiments, vertical pivots may be located on pivot flanges of mirror mount 102*b* having pivot balls that allow the mirror mount to rotate about a horizontal axis passing through the center of the pivot balls so that the mirror 104 is deflected in a vertical direction. The deflection of the mirror holder in a vertical direction is achieved by moving the vertical adjustment arm 122 using a vertical adjustment screw 120. As also illustrated in FIG. 6, a cleat 114 is secured to a baseplate 128 (FIG. 8). The horizontal adjustment arm 110 is moved relative to the cleat 114. Spring 116 holds the tip of the adjustment screw in horizontal adjustment arm 110 against the cleat 114.

Figure 7:
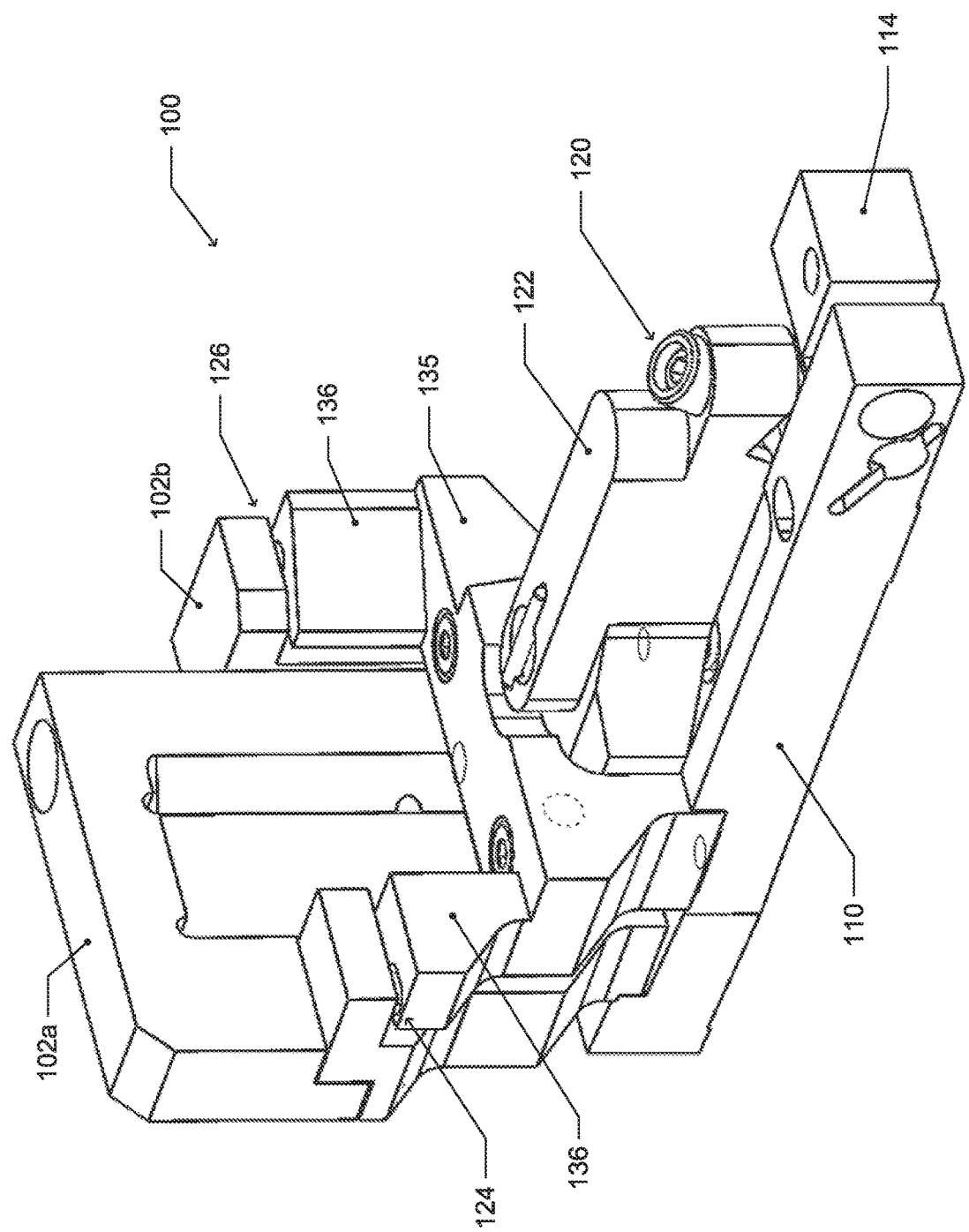
FIG. 7 is another view of the embodiment of the adjustable mirror mount illustrated in FIG. 5.

FIG. 7 is another view of the adjustable mirror mount 100 viewed from a different angle. As illustrated in FIG. 7, the mirror holder 102*a/b* is rigidly connected to the vertical pivots 124 and 126 located on support columns 136. Vertical adjustment arm 122 is coupled to the mirror holder and moves in a vertical direction as a result of adjustment of the vertical adjustment screw 120. A vertical gap between support structure 135 and the vertical adjustment arm 122 allows the vertical adjustment arm to move within an adjustment range without interference by the support structure 135. FIG. 7 also illustrates the horizontal adjustment arm 110 and cleat 114.

FIG. 8 is a cross-sectional view of the embodiment of the adjustable mirror mount 100 illustrated in FIG. 5. As shown in FIG. 8, the adjustable mirror mount 100 is mounted on a baseplate 128. The horizontal adjustment arm 110 is coupled to the baseplate 128 with a horizontal pivot pin 118. Horizontal pivot pin need not be a pin, but may be any single axis rotation joint that rotationally couples the horizontal adjustment arm with the base plate. The horizontal adjustment arm 110 rotates around the horizontal pivot pin 118 on the baseplate 128. The horizontal pivot pin is aligned with the vertical axis 198 passing through the reflection point 106. The distance between the center of the opening for the horizontal adjustment screw and the center of the horizontal pivot pin 118 is the horizontal pivot arm length 146. As indicated above, the horizontal pivot arm length 146 controls the amount that the horizontal adjustment screw 112 (FIG. 5) must be moved to create a desired rotation of the mirror 104. In other words, a large horizontal pivot arm length 146 allows for better adjustment and control of the pivoting of the mirror 104 and mirror holder about a vertical axis 198 that passes through the reflection point 106 (FIG. 5) of the mirror 104. In some cases the horizontal pivot arm length is between about 50 mm and about 55 mm. FIG. 8 also illustrates the manner in which the mirror holder 102b is mechanically coupled (e.g., bolted, welded, brazed, soldered, or glued) to the vertical adjustment arm 122; in this case, it is by way of a bolted interface. In some cases, parts 102a and 102b may be held together by a bolted interface. In some cases, mirror 104 may be attached to mirror holder 102a using a glue or epoxy. As disclosed above, the vertical adjustment screw 120 adjusts the position of the vertical adjustment arm 122.

Figure 9:
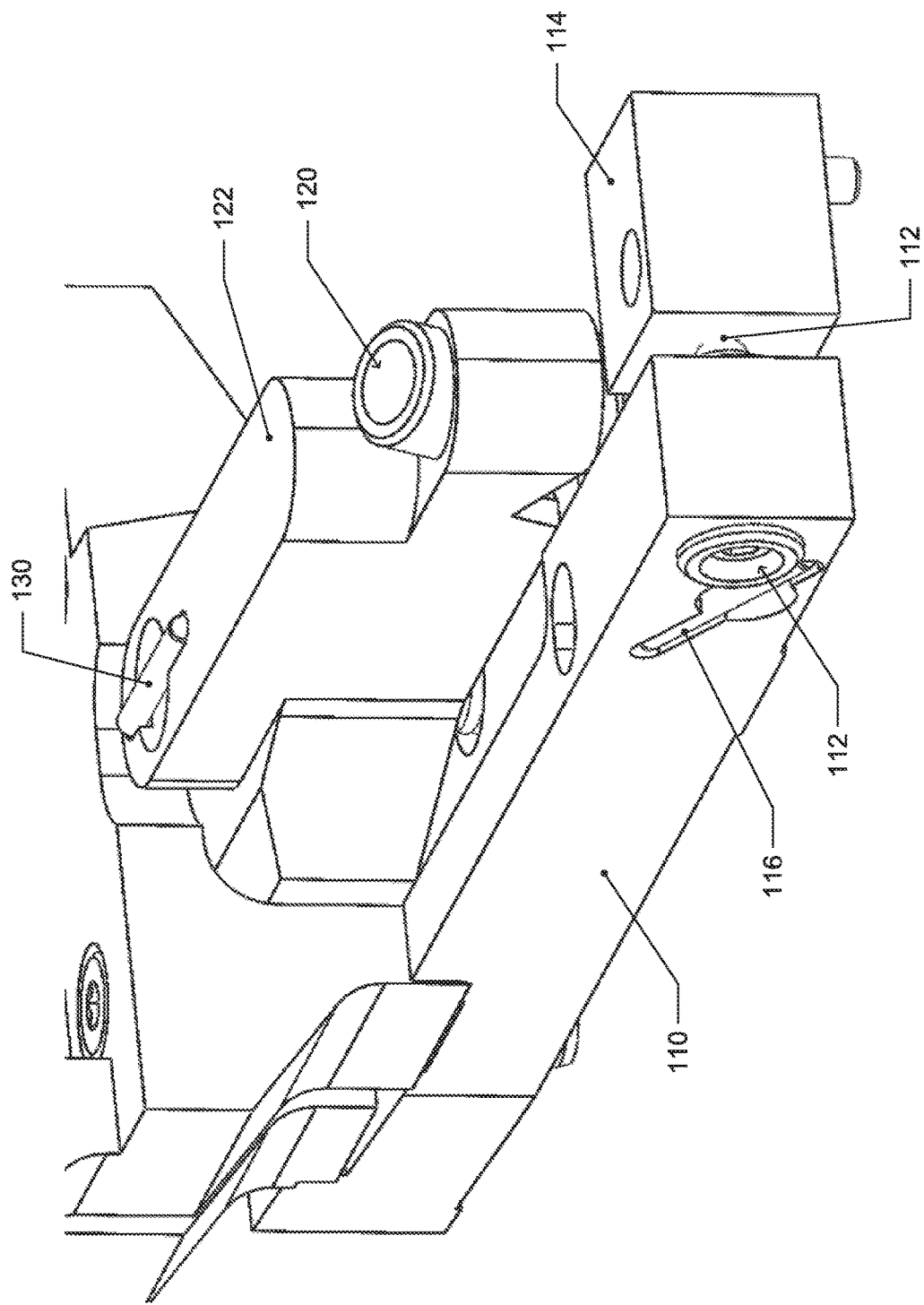
FIG. 9 is a view of a portion of the embodiment of the adjustable mirror mount of FIG. 5.

FIG. 9 is a close view of a portion of the adjustable mirror mount 100 of FIG. 5. As illustrated in FIG. 9, the tip of adjustment screw 112 in horizontal adjustment arm 110 is held against the cleat 114 by spring 116. The horizontal adjustment screw 112 contacts the cleat 114 to adjust the horizontal adjustment arm 110. Cleat 114 is secured to a baseplate 128 (FIG. 8) by a screw and a dowel pin, the end of which can be seen protruding out of the bottom of the cleat 114. The vertical adjustment screw 120 adjusts the vertical adjustment arm 122. In some embodiments, a mirror mount includes a spring 130 that provides a biasing force to either push or pull the vertical adjustment arm in a downward vertical direction.

Figure 10:
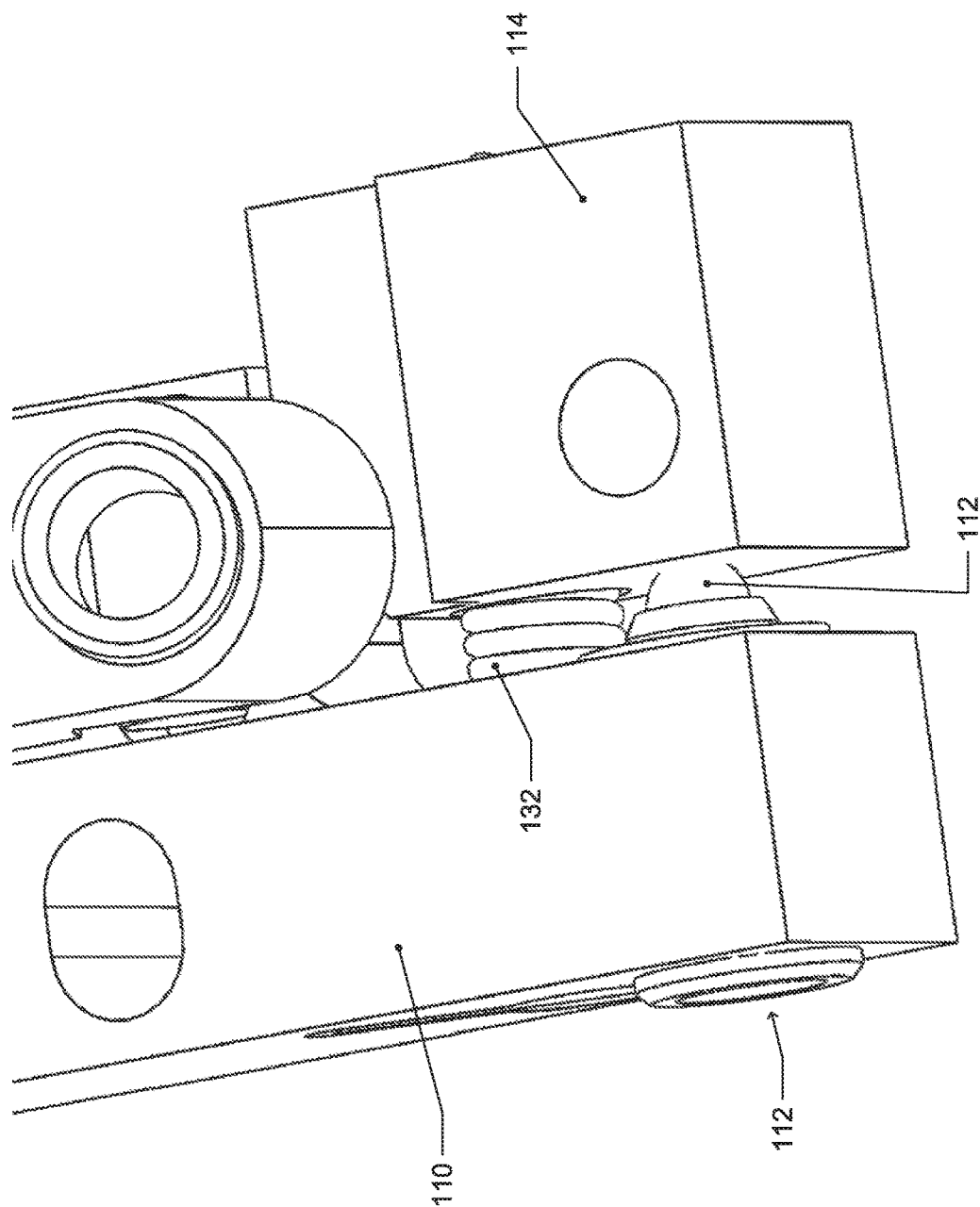
FIG. 10 is another view of a portion of the embodiment of the adjustable mirror mount of FIG. 5.

FIG. 10 is another top view of an end of the adjustable mirror mount 100. As shown in FIG. 10, the horizontal adjustment screw 112 abuts against the cleat 114. While not shown, in some cases the tip of horizontal screw 112 is pressed against a sapphire pad or another smooth surface on cleat 114. Horizontal adjustment spring 132 is in an elongated state so that it provides a biasing force that holds adjustment screw 112 against the cleat 114. In this manner, the horizontal adjustment arm 110 is adjustably coupled to the cleat 114, which is secured to the baseplate 128 (FIG. 8). While not depicted, in some embodiments adjustment screw 112 may pass through the horizontal adjustment arm and be threaded into cleat 114 such that the adjustment screw limits the separation between the horizontal adjustment arm and the cleat. In such cases, spring 132 is configured to be in a compressed state and provides a biasing force that pushes the horizontal adjustment 110 arm away from cleat 114.

Figure 11:
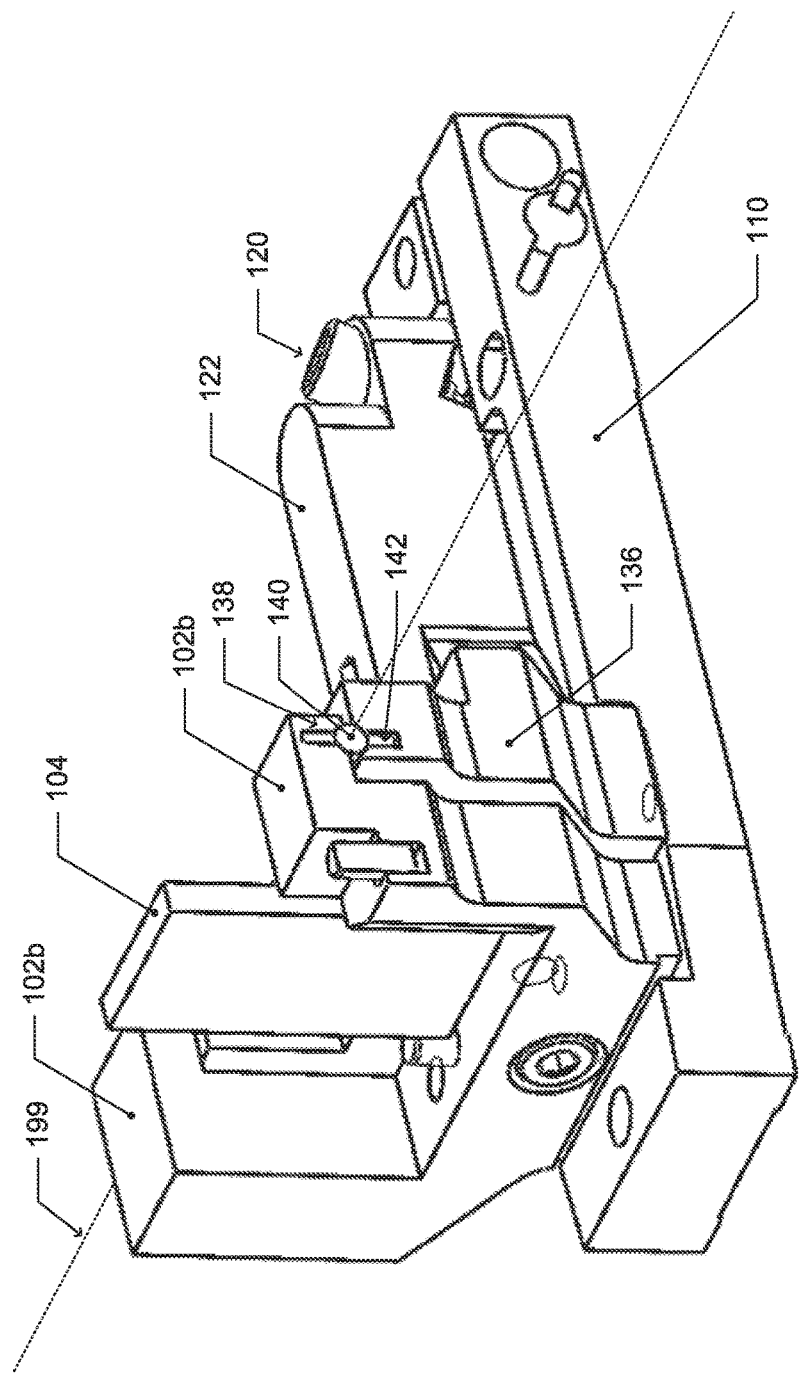
FIG. 11 is a cutaway view of the embodiment of the adjustable mirror mount of FIG. 5.

FIG. 11 is another cross-sectional view of the embodiment of the adjustable mirror mount 100 illustrated in FIG. 5. As illustrated in FIG. 11, part of the mirror holder is cut away to show a vertical pivot. In one embodiment vertical pivot includes a pivot ball 140 that sits in a cone-shaped opening 142 on the support column 136 and in a cone-shaped opening 138 in a vertical pivot flange of mirror holder 102b. The vertical adjustment arm 122 is coupled to the mirror holder, which in turn is coupled to the horizontal adjustment arm 110 by vertical pivots. As the vertical adjustment arm 122 moves in a vertical direction, the vertical pivot flange 124 pivots on the pivot ball 140. As can be seen from FIG. 11, the front surface of the mirror 104 is horizontally spaced apart from the pivot ball 140. As such, the mirror 104 pivots on a horizontal axis 199 that runs horizontally through the pivot ball 140. Movement of the mirror 104 using the vertical adjustment arm 122 will cause some lateral displacement (x), as illustrated in FIGS. 4a and 4b, which will result in a very small amount of cross-coupling displacement. As also shown in FIG. 11, the horizontal adjustment arm 110 is coupled to the support column 136, so that horizontal movement of the horizontal adjustment arm causes the support column 136 to rotate the vertical pivots 124 and 126 (see FIG. 6) around a vertical axis 198 (see FIG. 8) that passes through the front reflective surface of the mirror 104 (or that is coincident with the front reflective surface of the mirror when the mirror is parallel to the vertical axis). In other words, horizontal translation of the horizontal adjustment arm 110 moves the support column 136 horizontally, which is transferred to the vertical pivot flange 124 to rotate the mirror holder and mirror 104.

Figure 12:
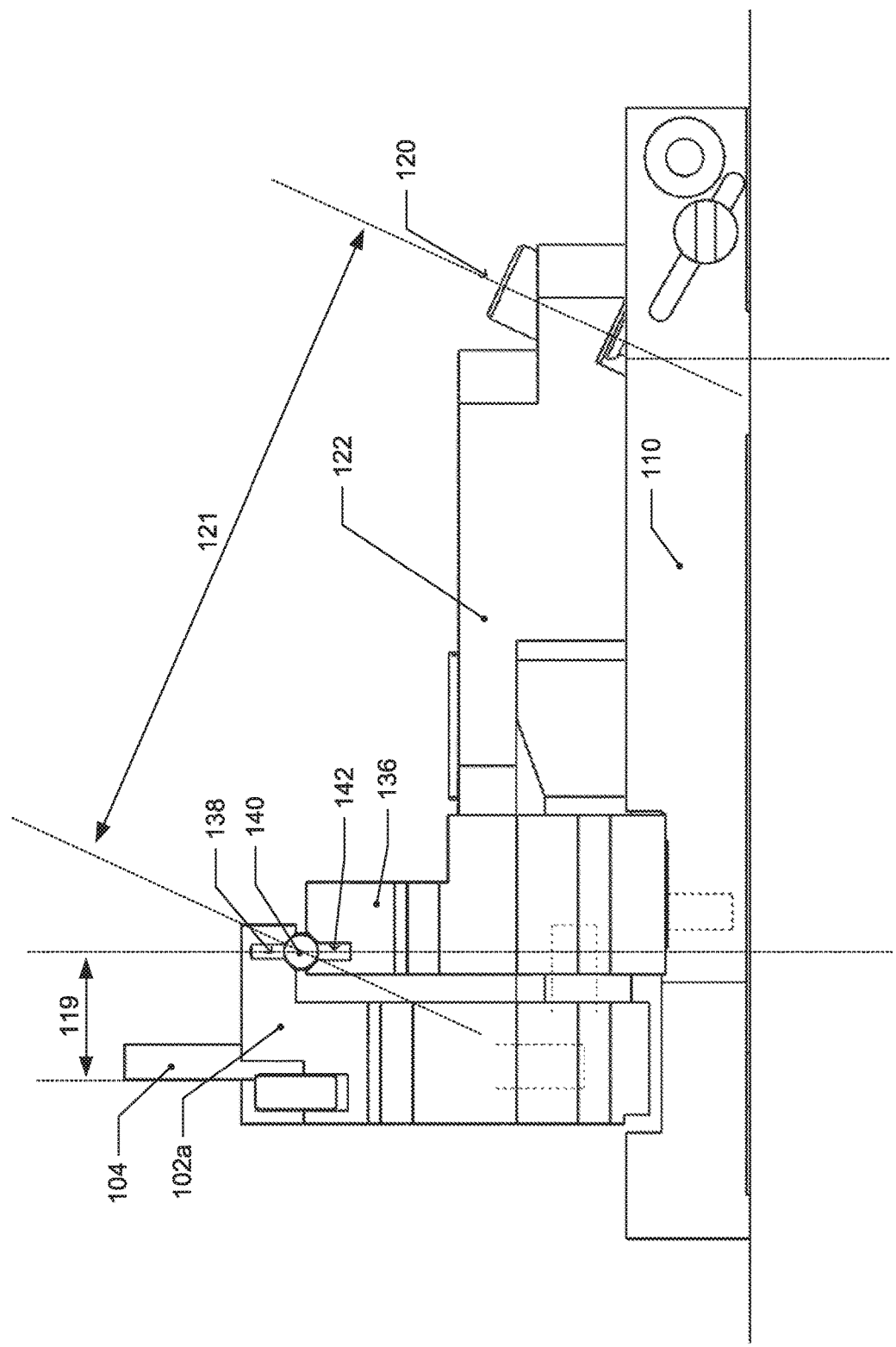
FIG. 12 is a sectional side view of the embodiment of the adjustable mirror mount of FIG. 5.

FIG. 12 is a side cross-sectional view of the embodiment of the adjustable mirror mount 100 illustrated in FIG. 5. As shown in FIG. 12, the support column 136 has a cone-shaped opening 142 in which a pivot ball 140 is disposed. A cone-shaped opening 138 in mirror holder 102a centers the pivot ball 140 in the cone-shaped opening 138. As illustrated in FIG. 12, the front reflective surface of mirror 104 is spaced apart from the center of the pivot ball 140 by a distance r (marked by distance 119). Because of the flat angles relative to the mirrors at which the light beams may be deflected, as illustrated in FIG. 1, the pivot ball 140 is placed in the location illustrated in FIG. 12 to avoid blocking of the light beam 108, as well as any through-beam 107 coming at an angle from behind for a pass-through adjuster, e.g., a dichroic mirror adjuster. In some cases, a mirror mount is configured so that light beam 108 and/or through-beam 107 will not be occluded by the mirror holder 102a when having incident angle that is less than about 50° from the mirror surface. In some cases, beam 108 or 107 may be directed at mirror 104 at an angle less than about 40° or less than about 35° from the mirror surface without being occluded by the mirror holder. If the vertical pivots were located on the side of the mirror 104, the light beam 108 could be blocked for many packaging arrangements. Consequently, spacing the pivot point at a small distance (e.g., 7 mm) from the front reflective surface of the mirror or filter allows for sufficient precision for guidance of the light beam 108 (FIG. 5), so that cross-coupling is not a problem, but still allows for interference-free beam passage.

As also illustrated in FIG. 12, horizontal adjustment arm 110 is connected to the support column 136. Rotation of the horizontal adjustment arm 110 transfers the movement to the support column 136, which in turn transfers the rotation to the pivot ball 140 and mirror holder 102*a/b* to rotate the mirror 104 about a vertical axis. Vertical adjustment of the mirror 104 is caused by turning the vertical adjustment screw 120, which moves the vertical adjustment arm 122 in a vertical direction. The perpendicular distance between the horizontal axis passing through vertical pivots (124 and 126) and the axis of vertical adjustment screw 120 is the vertical pivot arm length 121. This length is the length that is effective in causing the mirror 104 to rotate around a horizontal axis 199 (see FIG. 11) that extends through the middle of the pivot ball 140. In some cases the vertical pivot arm length is between about 35 mm and about 45 mm.

Figure 13:
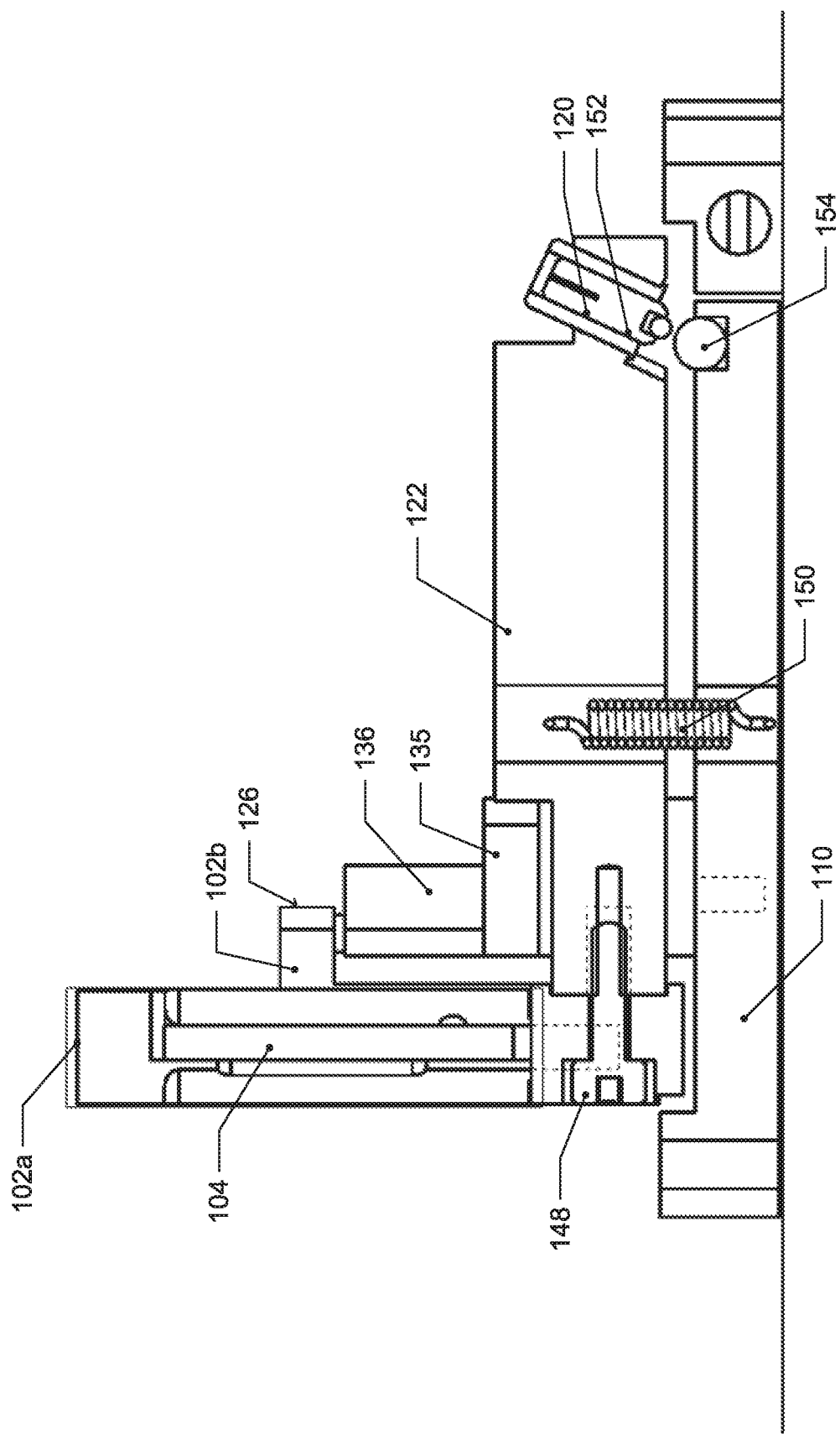
FIG. 13 is another sectional view of the embodiment of the adjustable mirror mount of FIG. 5.

FIG. 13 is a cross-sectional view of the embodiment of an adjustable mirror mount 100 illustrated in FIG. 5. As shown in FIG. 13, the mirror holder holds the mirror 104. The mirror holder is connected to the vertical adjustment arm 122 by way of bolt 148. Support column 136 is protrudes from support structure 135 which is coupled to the horizontal adjustment arm 110. Vertical adjustment arm 122 is held against the horizontal adjustment arm 110 by way of spring 150, which also holds the flanges to the support column, trapping the pivot balls in the correct location. Vertical adjustment screw 120 adjusts a contact ball 152 that engages a ball or rod 154 to adjust the vertical height of the vertical adjustment arm 122. In some cases, instead of engaging a ball or rod a contact ball engages a planar surface, e.g., a sapphire pad oriented perpendicularly to the adjuster screw axis.

Figure 14:
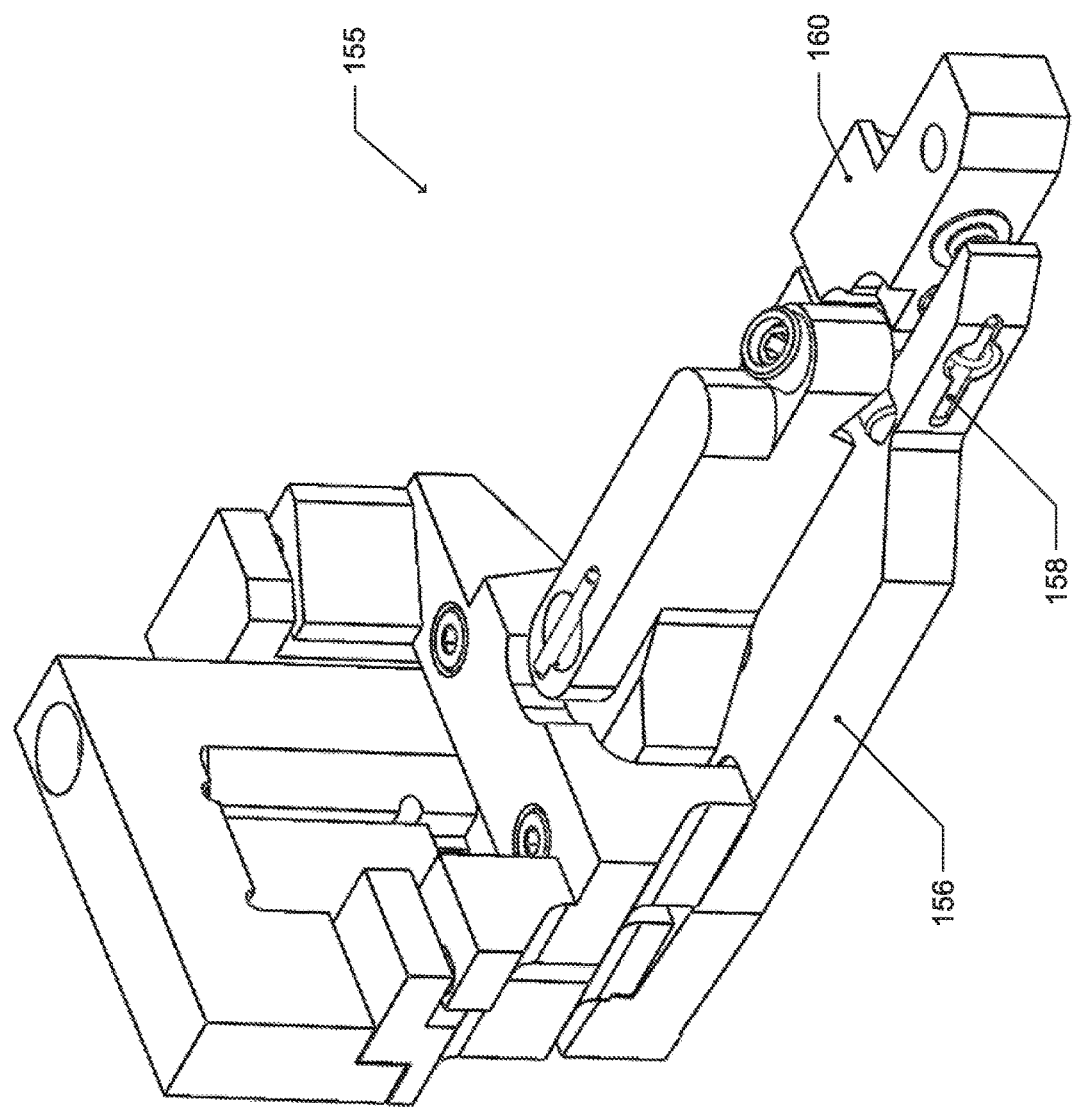
FIG. 14 is a view of another embodiment of an adjustable mirror mount.

FIG. 14 is a view of another embodiment of an adjustable mirror mount 155. As shown in FIG. 14, the horizontal adjustment arm 156 is pulled toward a stationary cleat 160 by spring 158.

Figure 15:
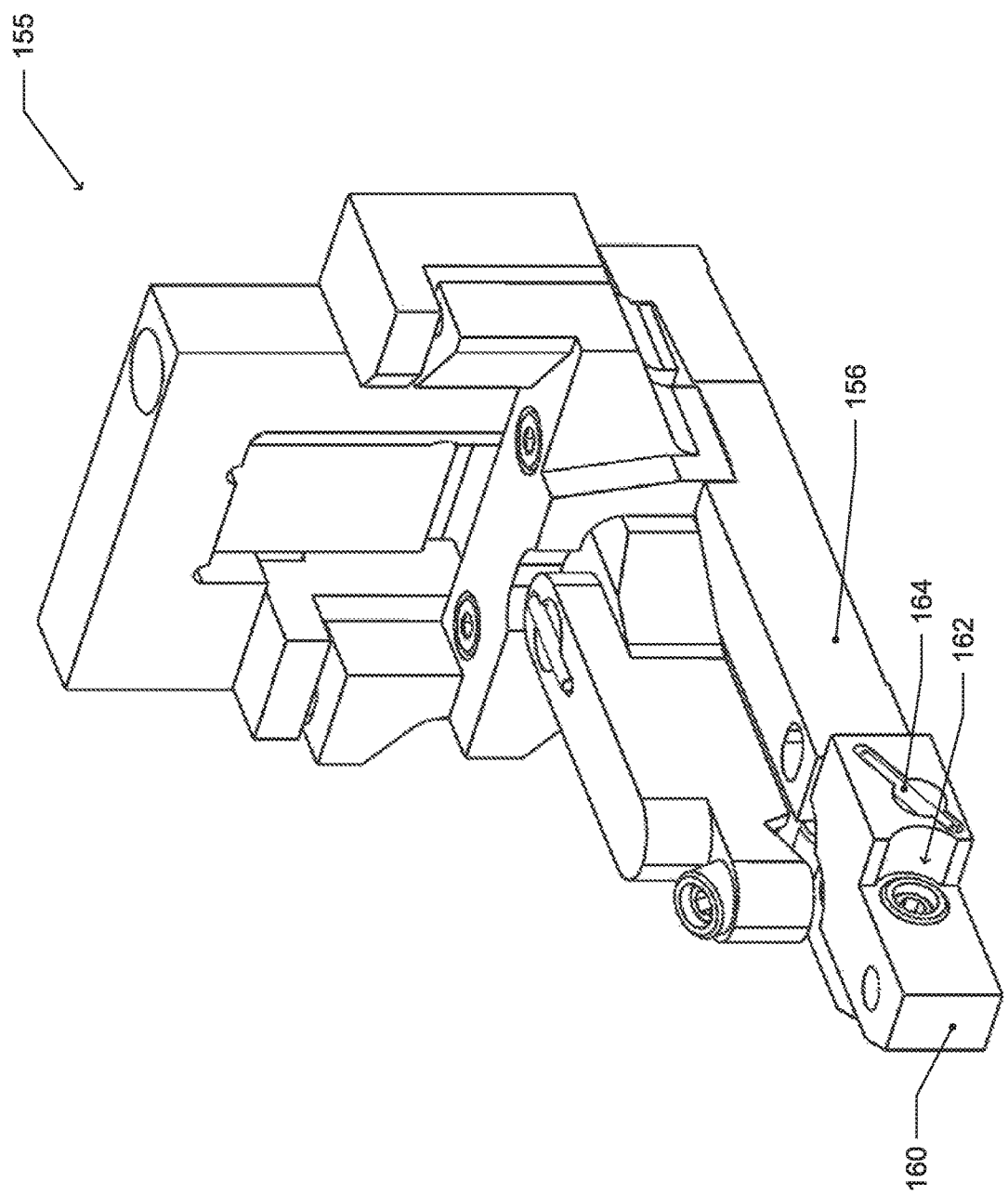
FIG. 15 is another view of the embodiment of an adjustable mirror mount of FIG. 14.

FIG. 15 provides another view of the adjustable mirror mount 155 depicted in FIG. 15. As shown in FIG. 15, an adjustment screw 162 is mounted in the cleat 160 to adjust the position of the horizontal adjustment arm 156. Spring end 164 illustrates the manner in which the spring is secured to the cleat 160. In this manner, in tight locations, the embodiment of FIGS. 14 and 15 can be utilized to adjust the horizontal adjustment arm 110 or 155 from either side of a stationary cleat.

The embodiments disclosed therefore provide an adjustable mirror mount that is capable of adjusting a reflective mirror (or dichroic filter for a pass-through adjuster) in two axes with a high degree of precision and in a confined area. This allows multiple beams from multiple lasers to be combined into a single combined beam with a high degree of accuracy and precision. Of course, other applications of the adjustable mirror mount can be used including using the principles disclosed to adjust other optical components, including lenses.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A system comprising:
a first adjustable mirror mount; and
a second adjustable mirror mount, wherein:
each of the adjustable mirror mounts includes:
a mirror holder, a cleat, and a horizontal adjustment arm connected to the mirror holder, wherein the mirror holder is configured to hold a mirror having a reflection surface, and wherein the horizontal adjustment arm and the mirror holder are configured to rotate about a vertical axis that passes through the reflection surface relative to the cleat,
a stem portion that includes the horizontal adjustment arm,
a cap portion that is transverse to the stem portion and that includes the mirror holder, and
an interior corner region formed between the cap portion and a first side of the stem portion,
the first adjustable mirror mount is positioned such that an end of the cap portion of the first adjustable mirror mount is located in the interior corner region of the second adjustable mirror mount.

2. The system of claim 1, wherein:
each of the adjustable mirror mounts has an overall shape substantially in the shape of a T when viewed along a direction parallel to the vertical axis of that adjustable mirror mount,
for each of the adjustable mirror mounts, the stem portion substantially bisects the cap portion,
the T forms the interior corner region between the cap portion and the first side of the stem portion, and
the T forms a second interior corner region formed between the cap portion and a second side of the stem portion.

3. The system of claim 2, wherein for the first and second adjustable mirror mounts, the stem portion bisects the cap portion into equal halves.

4. The system of claim 2, wherein for the first and second adjustable mirror mounts, the stem portion bisects the cap portion into differently sized portions.

5. The system of claim 2, wherein for each of the adjustable mirror mounts, a vertex of the T shape is positioned at a reflection point of the mirror of that adjustable mirror mount.

6. The system of claim 2, further comprising a third adjustable mirror mount, wherein the second adjustable mirror mount is positioned such that an end of the cap portion of the second adjustable mirror mount is located in the interior corner region of the third adjustable mirror mount.

7. The system of claim 6, wherein a single optical line-of-sight passes through the mirror holders of the first, second, and third adjustable mirror mounts.

8. The system of claim 6, wherein:
for each adjustable mirror mount, the interior corner region is a first triangular region bounded at least in part by the cap portion and the stem portion of that adjustable mirror mount, and
for each adjustable mirror mount, the second interior corner region is a second triangular region bounded at least in part by the cap portion and the stem portion of that adjustable mirror mount.

9. The system of claim 1, wherein:
each of the adjustable mirror mounts has an overall shape substantially in the shape of an L when viewed along a direction parallel to the vertical axis of that adjustable mirror mount, and
the L forms the interior corner region between the cap portion and the first side of the stem portion.

10. The system of claim 9, wherein for each of the adjustable mirror mounts, a vertex of the L shape is positioned offset from a reflection point of the mirror of that adjustable mirror mount.

11. The system of claim 9, further comprising a third adjustable mirror mount, wherein the second adjustable mirror mount is positioned such that an end of the cap portion of the second adjustable mirror mount is located in the interior corner region of the third adjustable mirror mount.

12. The system of claim 11, wherein a single optical line-of-sight passes through the mirror holders of the first, second, and third adjustable mirror mounts.

13. The system of claim 1, wherein for each adjustable mirror mount, the interior corner region is a triangular region bounded at least in part by the cap portion and the stem portion that adjustable mirror mount.

14. The system of claim 1, wherein a single optical line-of-sight passes through the mirror holders of the first and second adjustable mirror mounts.

15. The system of claim 1, wherein for the first and second adjustable mirror mounts, an angle between the stem portion and the cap portion is perpendicular.

16. The system of claim 1, wherein for the first and second adjustable mirror mounts, an angle between the stem portion and the cap portion is acute.

17. The system of claim 1, wherein for the first and second adjustable mirror mounts, the length of the cap portion is less than about 35% of the length of that adjustable mirror mount.

18. The system of claim 17, wherein for the first and second adjustable mirror mounts, the length of the cap portion is less than about 25% of the length of that adjustable mirror mount.

19. The system of claim 1, wherein the length of each adjustable mirror mount in a direction corresponding to the stem portion is less than about 6 inches.

20. The system of claim 1, wherein each adjustable mirror mount further includes:
a vertical adjustment arm rigidly connected to the mirror holder,
a horizontal pivot coupled with the horizontal adjustment arm and having a center axis aligned with the vertical axis,
a horizontal adjustment screw, and
a vertical adjustment screw, wherein:
the mirror holder is further configured to hold the mirror such that the reflection surface of the mirror is parallel with a horizontal axis,
the horizontal adjustment arm is coupled to the vertical adjustment arm by one or more vertical pivots that allow the vertical adjustment arm to rotate about the horizontal axis relative to the horizontal adjustment arm,
rotation of the horizontal adjustment screw changes a separation distance between the horizontal adjustment arm and the cleat and causes the horizontal adjustment arm and the mirror holder to rotate about the vertical axis relative to the cleat when the horizontal pivot and the cleat are held in fixed locations, and
rotation of the vertical adjustment screw changes a separation distance between the vertical adjustment arm and the horizontal adjustment arm and causes the vertical adjustment arm and the mirror holder to rotate about the horizontal axis.

* * * * *